(12) United States Patent
Nelson et al.

(10) Patent No.: US 11,849,320 B2
(45) Date of Patent: *Dec. 19, 2023

(54) TRUSTED OPERATING SYSTEM IN AN INTERNET OF THINGS (IOT) DEVICE

(71) Applicant: T-Mobile Innovations LLC, Overland Park, KS (US)

(72) Inventors: Tracy L Nelson, Overland Park, KS (US); Lyle W. Paczkowski, Mission Hills, KS (US); Ivo Rook, New York, NY (US)

(73) Assignee: T-Mobile Innovations LLC, Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 17/723,097

(22) Filed: Apr. 18, 2022

(65) Prior Publication Data

US 2022/0240088 A1    Jul. 28, 2022

Related U.S. Application Data

(63) Continuation of application No. 16/508,244, filed on Jul. 10, 2019, now Pat. No. 11,356,845.

(51) Int. Cl.
| | |
|---|---|
| *H04W 12/06* | (2021.01) |
| *G06F 9/4401* | (2018.01) |
| *H04W 12/12* | (2021.01) |
| *H04L 67/12* | (2022.01) |
| *H04W 12/10* | (2021.01) |
| *H04W 84/04* | (2009.01) |

(52) U.S. Cl.
CPC .......... *H04W 12/06* (2013.01); *G06F 9/4403* (2013.01); *H04L 67/12* (2013.01); *H04W 12/10* (2013.01);

(Continued)

(58) Field of Classification Search
CPC ..... H04W 12/06; H04W 12/10; H04W 12/12; H04W 84/042; H04W 12/04;
(Continued)

(56) References Cited

U.S. PATENT DOCUMENTS

| | | |
|---|---|---|
| 9,282,898 B2 | 3/2016 | McRoberts et al. |
| 10,754,843 B2 * | 8/2020 | Matsuda ............. G06F 16/2282 |

(Continued)

FOREIGN PATENT DOCUMENTS

CN    1172224 C  * 10/2004  ............. G06F 21/64

OTHER PUBLICATIONS

FAIPP Pre-Interview Communication dated Dec. 9, 2021 U.S. Appl. No. 16/508,244, filed Jul. 10, 2019.

(Continued)

*Primary Examiner* — Hai Phan
*Assistant Examiner* — Anthony D Afrifa-Kyei

(57) ABSTRACT

A method of attaching to a wireless communication network to receive wireless communication service. The method comprises calculating a checksum by a monitor application over at least a portion of an operating system stored in a wireless communication device, wherein the monitor application is stored in a trusted portion of memory of the device and executes in a trusted execution environment (TEE) of the device and wherein the operating system is authorized by a wireless communication network, comparing the calculated checksum value by the monitor application to a checksum value stored in the TEE, based on determining that the calculated checksum value matches the stored checksum value, rebooting the device to execute the operating system, and transmitting radio access credentials to the wireless communication network by the device, whereby the device authenticates into the wireless coverage of the wireless communication network based on the radio access credentials.

20 Claims, 5 Drawing Sheets

(52) U.S. Cl.
CPC .......... *H04W 12/12* (2013.01); *H04W 84/042* (2013.01)

(58) Field of Classification Search
CPC . H04W 12/086; H04W 12/126; H04W 12/71;
H04W 88/02; G06F 9/4403; G06F 21/74;
G06F 21/00; G06F 21/70; G06F 21/71;
G06F 21/53; G06F 21/554; G06F 21/602;
G06F 2221/034; G06F 2221/2143; G06F
21/6218; G06F 12/1416; G06F 21/577;
G06F 21/88; G06F 2212/1052; G06F
2212/154; G06F 2221/2105; H04L 67/12;
H04L 9/0822; H04L 9/083; H04L 9/0894;
H04L 43/10; H04L 63/06; H04L 63/08;
H04L 63/20; G09C 1/00
See application file for complete search history.

(56) References Cited

U.S. PATENT DOCUMENTS

| | | | |
|---|---|---|---|
| 11,356,845 B1 | 6/2022 | Nelson et al. | |
| 2017/0344407 A1* | 11/2017 | Jeon | G06F 21/74 |
| 2018/0293204 A1* | 10/2018 | Packer Ali | G06F 1/3293 |
| 2018/0349669 A1* | 12/2018 | Kim | G06F 3/041 |
| 2019/0311141 A1* | 10/2019 | Brehove | G06F 21/604 |
| 2019/0361721 A1* | 11/2019 | Massoudi | H04L 9/3247 |
| 2020/0084202 A1* | 3/2020 | Smith | H04L 41/5003 |
| 2020/0250302 A1* | 8/2020 | Chen | G06N 20/00 |

OTHER PUBLICATIONS

Notice of Allowance dated Feb. 14, 2022 U.S. Appl. No. 16/508,244, filed Jul. 10, 2019.

* cited by examiner

TRUSTED OPERATING SYSTEM IN AN INTERNET OF THINGS (IOT) DEVICE

CROSS-REFERENCE TO RELATED APPLICATIONS

This application is a continuation of and claims priority under 35 U.S.C. § 120 to U.S. patent application Ser. No. 16/508,244 filed on Jul. 10, 2019, entitled "Trusted Operating System in an Internet of Things (IoT) Device" by Tracy L. Nelson, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Internet of Things (IoT) generally refers to the extension of Internet connectivity beyond conventional computer-like devices to a wide variety of physical devices not customarily associated with computers. For example, it is conventional that server computers, desktop computers, laptop computers, tablet computers, notebook computers, and smart phones may be connected to the Internet and may download content, upload content, and execute distributed applications via these Internet connections. It is unconventional that a refrigerator, an exhaust fan over a stovetop, or a coffee pot may be connected to the Internet. The continuing reduction in feature sizes of semiconductors and the continuing cost reductions of semiconductors have enabled embedding both sophisticated semiconductor logic and radio transceivers in systems on a chip (SoC) in many everyday items or inexpensive items. The proliferation of Internet enabled devices—IoT devices—is driving a great deal of technical innovation.

SUMMARY

In an embodiment, a method of attaching to a wireless communication network to receive wireless communication service is disclosed. The method comprises detecting by a wireless communication device associated with a wireless communication service subscription with a first wireless communication network that it is in wireless coverage of a second wireless communication network that is different from the first wireless communication network, wherein the device is executing a first operating system that is approved for use in the first wireless communication network. The method further comprises calculating a checksum by a monitor application over at least a portion of a second operating system stored on the device, wherein the monitor application is stored in a trusted portion of memory of the device and executes in a trusted execution environment (TEE) of the device and wherein the second operating system is approved for use in the second wireless communication network and comparing the calculated checksum value by the monitor application to a checksum value stored in the trusted portion of memory. The method further comprises, based on determining that the calculated checksum value matches the stored checksum value, rebooting the device to execute the second operating system; and looking up a plurality of wireless operating parameters by the monitor application, wherein the wireless operating parameters are stored in the TEE and are associated with the second wireless communication network. The method further comprises transmitting radio access credentials by the device to the second wireless communication network, wherein the wireless operating parameters looked up by the monitor application comprise the radio access credentials, whereby the device authenticates into the wireless coverage of the second wireless communication network based on the radio access credentials and communicating in a predefined wireless frequency band via the second wireless communication network by the device, wherein the wireless operating parameters looked up by the monitor application identify the predefined wireless frequency band.

In another embodiment, an Internet of Things (IoT) device is disclosed. The IoT device comprises a processor, wherein the processor is configured to provide a trusted execution environment (TEE) and a rich execution environment (REE), a non-transitory memory comprising a trusted portion and a non-trusted portion, wherein the non-trusted portion of the non-transitory memory stores a first operating system approved for use in a first wireless communication network and a second operating system approved for use in a second wireless communication network, a radio transceiver, and a monitor application stored in the trusted portion of the non-transitory memory. When executed by the processor in the TEE the monitor application, while the processor is executing the first operating system in the REE, calculates a checksum over at least a portion of the second operating system and compares the calculated checksum value to a checksum value stored in the TEE. The monitor application further, based on determining that the calculated checksum value matches the stored checksum value, reboots the processor to execute the second operating system in the REE, and transmits radio access credentials to the second wireless communication network via the radio transceiver, whereby the device authenticates into the wireless coverage of the second wireless communication network based on the radio access credentials.

In yet another embodiment, a method of attaching to a wireless communication network to receive wireless communication service is disclosed. The method comprises detecting by a wireless communication device associated with a wireless communication service subscription with a first wireless communication network that it is in wireless coverage of a second wireless communication network that is different from the first wireless communication network, wherein the device is executing a first operating system. The method further comprises calculating a checksum by a monitor application over at least a portion of a second operating system stored on the device, wherein the monitor application is stored in a trusted portion of a memory of the device and executes in a trusted execution environment (TEE) of the device and wherein the second operating system is authorized by the second wireless communication network. The method further comprises comparing the calculated checksum value by the monitor application to a checksum value stored in the TEE, based on determining that the calculated checksum value matches the stored checksum value, rebooting the device to execute the second operating system, and transmitting radio access credentials to the second wireless communication network by the device, whereby the device authenticates into the wireless coverage of the second wireless communication network based on the radio access credentials.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
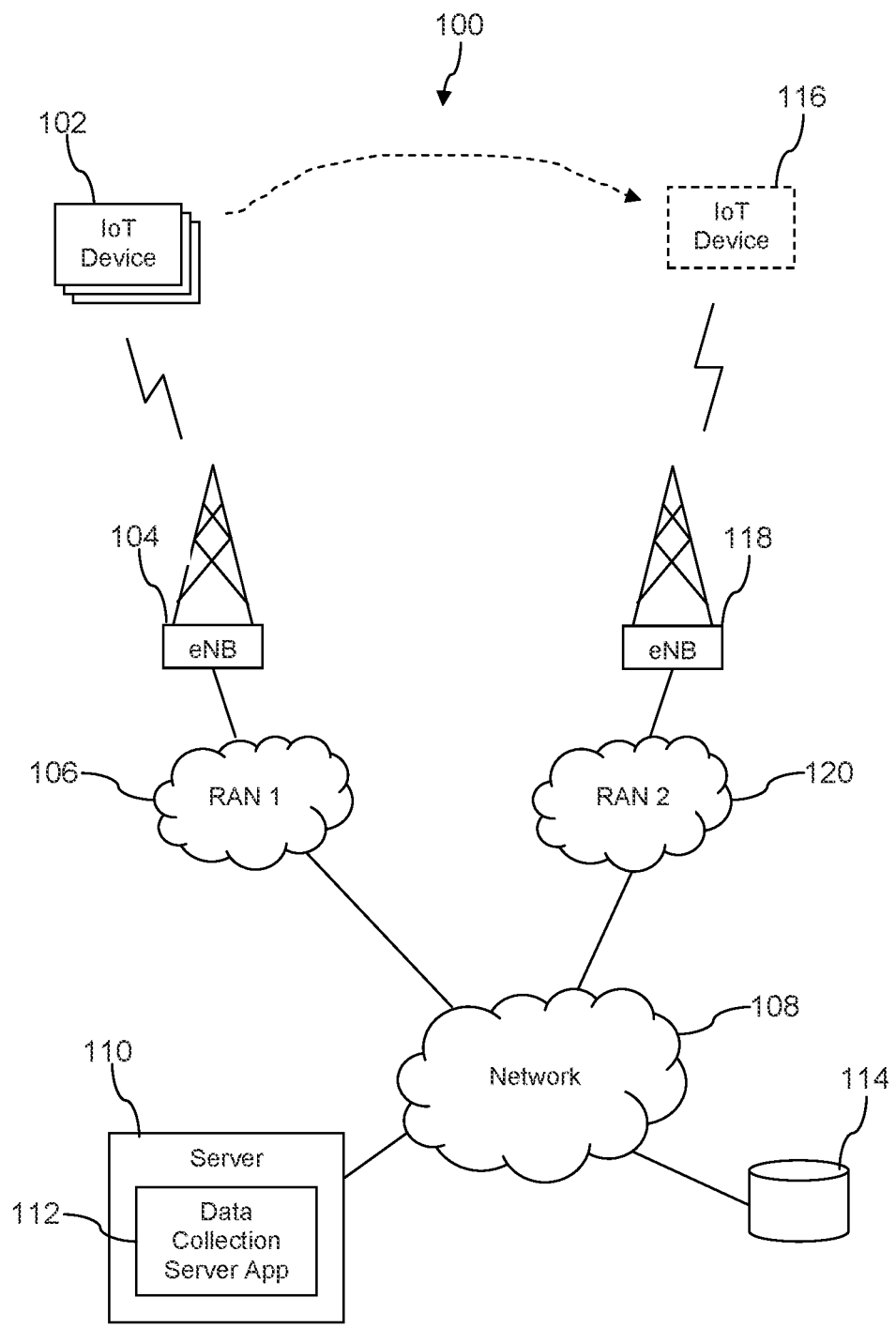
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Internet of things (IoT) devices can include a wide range of devices including traditional computers and computer-like devices, high cost appliances that have had computers and computer-like devices embedded in them, and low cost appliances that have had computer-like devices embedded in them. The distinguishing characteristic of IoT devices is engaged with their capability of connecting to the Internet and conducting Internet communications. This in turn entails having a logic processor capable of executing Internet communication protocols such as the Internet Protocol (IP) and transmission control protocol (TCP), having TCP/IP stack handling logic or software installed, and having a communication interface such as a radio transceiver.

Low cost IoT devices are expected to proliferate in the near future. Providing communication connectivity to these low cost IoT devices presents many challenges to wireless communication service providers. How are IoT devices that do not have a wireless communication service subscription prevented from accessing the radio access network (RAN)? How are IoT devices that do have a wireless communication service subscription authenticated for access to the RAN? How are IoT devices permitted to roam from a home wireless network to a roaming wireless network? How are IoT devices authenticated into a wireless network—either a home wireless network or a roaming wireless network—in a low impact, reliable, and secure way? The present disclosure teaches a system and a method of an IoT device authenticating into a roaming network without creating excessive processing burdens on the roaming network while at the same time mitigating the risk of fraudulent roaming. Thus, the present disclosure teaches a system and a method that provides a technical solution to a technical problem.

It is expected that many IoT devices will roam out of their home wireless communication networks as much as 60% or more of the time. Wireless service providers may wish to avoid providing coverage to IoT devices that have been rooted (e.g., have had their operating systems revised to defeat fraud prevention mechanisms of the operating systems). One way to do this would be to download and install an operating system (OS) that is approved by the wireless communication service provider on the IoT device at the time an IoT device roams into the RAN. But downloading OSs over the RAN, considering the large number of IoT devices that are expected to be deployed in the future, may be impracticable and/or may present an undesirable traffic burden on the RAN.

The present disclosure teaches pre-loading OSs of a plurality of wireless communication service providers in the IoT device at time of manufacturing and rebooting to an OS approved by a given wireless communication service provider at the time the IoT device roams into the RAN of the given service provider. To assure that the IoT device has not been rooted, the IoT device itself validates that the approved OS has not been altered by calculating a checksum over at least a portion of the OS and comparing that checksum to an authoritative checksum value stored in the IoT device at the time of manufacture. If the calculated checksum matches the stored authoritative checksum value, the approved OS has not been altered since the time of manufacture. The authoritative checksum value and the instructions that calculate the checksum are stored in a trusted portion of memory of the IoT device such that they cannot be compromised, and the instructions execute in a trusted execution environment (TEE) provided by a processor of the IoT device so its logic cannot be thwarted. If the calculated checksum does not match the authoritative checksum, the instructions do not permit the IoT device to initiate roaming. If the calculated checksum does match the authoritative checksum, the instructions cause the IoT device to reboot to the pre-loaded OS approved by the roaming wireless service provider and to present RAN access credentials for authentication into the RAN. An OS that has been validated as described above and as described further hereinafter may be referred to as a trusted operating system.

Wireless communication service providers may offer low cost wireless communication service subscription plans for use by IoT devices. To make such plans economically feasible, the service providers may mandate that the IoT devices communicate on specific wireless frequency bands and communicate according to constraints of a service level agreement (SLA) that restricts the consumption of limited wireless communication resources by the IoT devices. The trusted portion of memory may further store one or more wireless frequency bands and/or a service level agreement (SLA) associated with a wireless communication service provider. For example, the trusted portion of memory may store a first set of wireless frequency bands and a first SLA associated with a first service provider, store a second set of wireless frequency bands and a second SLA associated with a second service provider, and store a third set of wireless frequency bands and a third SLA associated with a third service provider. The IoT device may itself apply and enforce these constraints, for example based on instructions and/or data provided in the OS approved for use with each wireless network.

It is noted that the technical solution taught herein may provide significant efficiency gains in that it spares the roaming service provider core network the processing burden of detecting a roaming request, looking up an appropriate OS for the requesting IoT device (different IoT devices would load different approved OSs), and downloading via the RAN the OSs. It is further noted that this efficiency gain may be realized each time the IoT device switches from one RAN to another RAN. By embedding the enforcements of the wireless frequency band constraints and the SLA constraints in the instructions of the approved OS and by assuring the OS has not been subverted by rooting or other alteration, the burden on the wireless service provider of enforcing these restrictions is minimized and instead distributed to the IoT devices, a kind of edge computing. This may be considered to provide a processing efficiency gain from the perspective of the service provider's computer system.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 100 is described. In an embodiment, the system 100 comprises a plurality of IoT devices 102 wirelessly coupled to a network 108 by a first cell site 104 and a first radio access network (RAN) 106. The network 108 comprises one or more private networks, one or more public networks, or a combination thereof. In an embodiment, the network 108 comprises the Internet. The first cell site 104 and the first RAN 106 may be associated with a wireless communication network operated by a first wireless communication service provider. The IoT devices 102 may be subscribed to receive wireless communication service from the first service provider. Under some circumstances, however, one or more of the IoT devices 102—for example an IoT device 116—may roam into a roaming network provided by a second wireless communication service provider. In this case, the IoT device 116 is wirelessly coupled to the network 108 by a second cell site 118 and a second RAN 120. In some contexts, the second RAN 120 may be referred to as a roaming network.

The system 100 may further comprise a server computer 110 executing a data collection server application 112 and a data store 114. The IoT devices 102, 116 may transmit data they have collected to the data collection server application 112, and the server application 112 may store the data received from the IoT devices 102, 116 in the data store 114. In an embodiment, the server application 112 may process the raw data received from the IoT devices 102, 116 in some way, for example to generate summaries or collective metrics based on the raw data and these summaries and/or metrics may be stored in the data store 114. It is understood that the system 100 may comprise any number of cell sites 104, 118, any number of IoT devices 102, 116, any number of different RANs 106, 120, any number of servers 110, and any number of data stores 114.

In an embodiment, different organizations collect data from the IoT devices 102, 116. For example, a public electric utility company may collect data from IoT devices 102, 116 that are smart electric meters. For example, an energy development company may collect data from IoT devices 102, 116 that are gas flow meters and gas compression pumps at remote gas pipeline stations. For example, a trucking company may collect data from IoT devices 102, 116 that are coupled to trailers. Each of these different organizations may maintain their own server 110 and their own data store 114 to receive and maintain their data from their IoT devices 102, 116.

The data collected from the IoT devices 102, 116 may comprise any kind of data. The data may comprise sensor data such as temperature data, pressure data, electrical current data, electrical voltage data, magnetic field strength data, weight data, velocity data, acceleration data, gas composition data, gas concentration data, fluid flow rate, and other data. The data may comprise records of events such as financial transactions (e.g., a residential refrigerator purchasing milk and eggs from a local grocery store when inventory inside the refrigerator drops below a predefined threshold), communications activity, user inputs, and other events.

Figure 2:
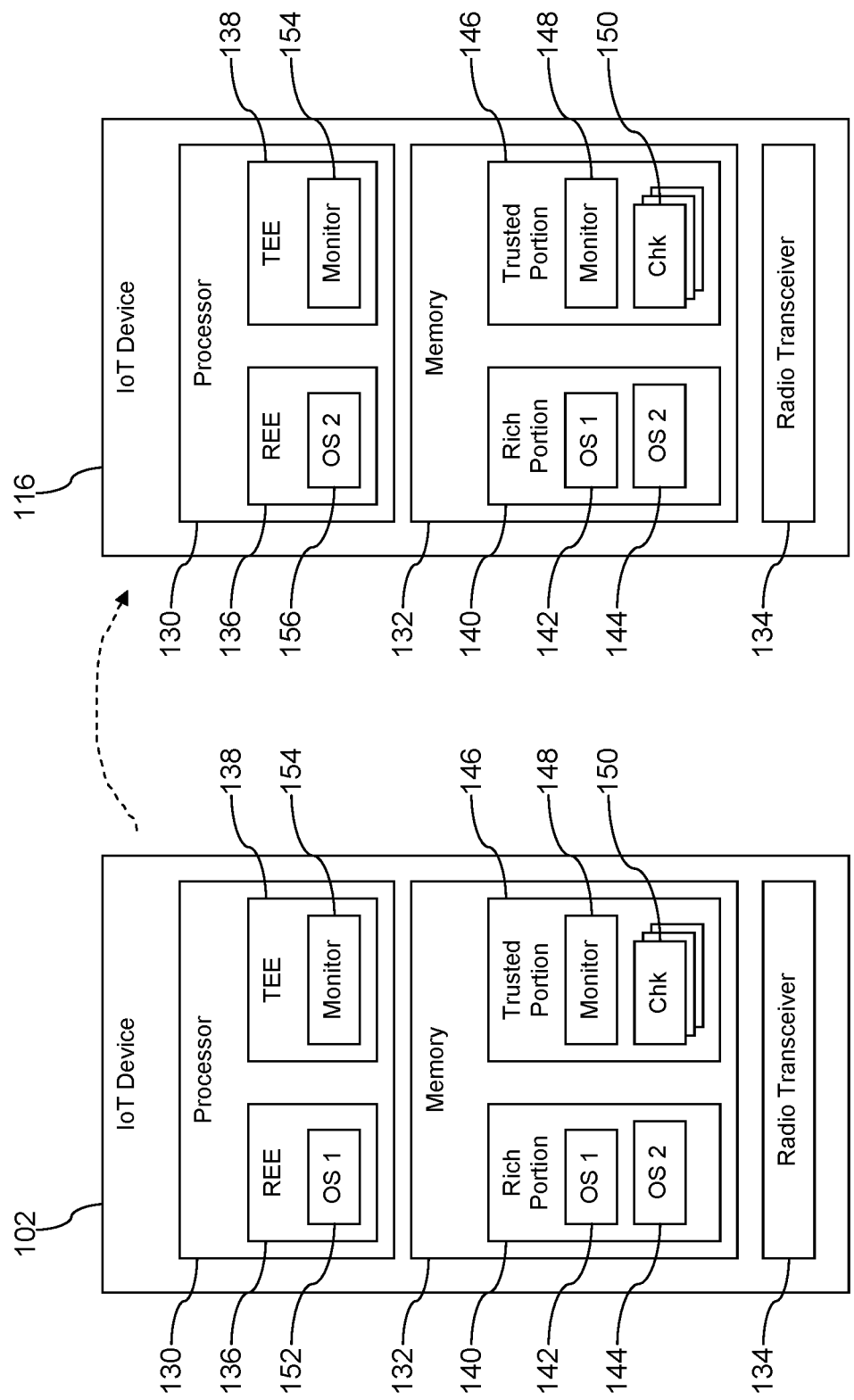
FIG. 2 is a block diagram of an Internet of Things (IoT) device according to an embodiment of the disclosure.

Turning now to FIG. 2, further details of IoT devices 102, 116 are described. In an embodiment, the IoT device 102 comprises a processor 130, a memory 132, and at least one radio transceiver 134. The radio transceiver 134 may provide a communication link to the cell site 104, 118 according to one of a 5G, a long term evolution (LTE), a code division multiple access (CDMA), or a global system for mobile communications (GSM) telecommunication protocol. The radio transceiver 134 may provide a communication link to the cell site 104, 118 according to a 5G wireless protocol such as 5G New Radio or 5G LTE. In an embodiment, the IoT device 102, 116 may comprise a second radio transceiver (not shown) that provides a communication link via a WIFI communication protocol to a wireless access point (not shown) that is communicatively coupled to the network 108.

The processor 130 is configured to provide a rich execution environment (REE) 136 and a trusted execution environment (TEE) 138. The TEE 138, as described more fully above, provides a capability of executing trusted instructions in the processor 130 while preventing processes, threads, or instructions executing in the REE 136 from executing in the processor 130. Alternatively, the TEE 138 provides the capability of executing trusted instructions in a trusted portion of the processor 130 while preventing processes, threads, or instructions executing in the REE 136 from executing in the trusted portion of the processor 130. In an embodiment, the processor 130 may comprise a plurality of processor cores, wherein one of the processor cores is a trusted core or provides a trusted security zone. In an embodiment, at a first point in time the REE 136 executes an instance of a first operating system (OS1 instance) 152. The TEE 138 executes a monitor application instance 154. The TEE 138 may comprise local memory that stores configuration parameters, where this local memory of the TEE 138 is inaccessible to the REE 136.

The memory 132 comprises a non-transitory portion that itself comprises a rich portion of memory 140 and a trusted portion of memory 146. In some contexts the rich portion of memory 140 may be referred to as a non-trusted portion of memory. The rich portion of memory 140 comprises a first operating system (OS1) 142 and a second operating system (OS2) 144. In an embodiment, three operating systems are stored in the rich portion of memory 140. In another embodiment, more than three operating systems and less than 30 operating systems are stored in the rich portion of memory 140.

Each of the OSs 142, 144 comprises operating system instructions or code as well as configuration data. The OS 142, 144 may comprise one or more files. The OS 142, 144 may comprise a file system that comprises directories that each comprises one or more files. The REE 136 may access the rich portion of memory 140 but is disabled from accessing the trusted portion of memory 146. The OS1 142 may be an operating system approved by the first service provider for use in the first RAN 106. The OS2 144 may be an operating system approved by the second service provider for use the second RAN 120. A third operating system, when stored in the rich portion of memory 140 may be approved by a third service provider for use in a third RAN operated by the third service provider. In an embodiment, the TEE 138 may access the rich portion of memory 140 as well as the trusted portion of memory 146. In another embodiment, however, the TEE 138 is disabled from accessing the rich portion of memory 140, whereby to prevent the TEE 138 from being subverted in anyway by untrusted instructions or data stored in the rich portion of memory 140. The trusted portion of memory 146 comprises a monitor application 148 and a plurality of authoritative checksum values 150. The authoritative checksum values 150 may be stored in the trusted portion of memory 146 at time of the manufacture of the IoT device 102, 116.

When the REE 136 is executing the OS1 instance 152, some of the instructions and data of the OS1 142 stored in the rich portion of memory 140 are stored in local memory of the REE 136 and are executed by the REE 136. When the TEE 138 is executing the monitor application instance 154, some of the instructions and data of the monitor application 148 are stored in the local memory of the TEE 138 and executed by the TEE 138.

When the IoT device 102 roams from the first RAN 106 into the second RAN 120, the monitor application instance 154 causes the IoT device 102 to reboot to the OS2 144. The monitor application instance 154 may first validate the OS2 144 by calculating a checksum over the entire OS2 144 or portions of the OS2 144 and comparing this calculated checksum to a checksum 150 stored in the trusted portion or memory 146. If the OS2 144 successfully validates, the monitor application 148 causes the REE 136 and/or the processor 130 to reboot to the OS2 144. This situation is illustrated by the IoT device 116 in FIG. 2, where the REE 136 of the IoT device 116 is illustrated as executing an instance of a second operating system (OS2 instance) 156. When the REE 136 is executing the OS2 instance 156, some of the instructions and data of the OS2 144 stored in the rich portion of memory 140 are stored in local memory of the REE 136 and are executed by the REE 136. In an embodiment, the monitor application 148 does not validate the OS2 144 before rebooting to the OS2 144 but instead validates the OS2 144 after rebooting to the OS2 144. In an embodiment, the monitor application 148 validates the OS2 144 before rebooting to the OS2 144 and also validates the portions of the OS2 144 making up the OS2 instance 156 stored in the REE 136.

If the OS2 144 or the portions of the OS2 144 making up the OS2 instance 156 stored in the REE 136 do not validate, the monitor application instance 154 does not reboot to the OS2 144. If the OS2 144 and/or portions of the OS2 144 making up the OS2 instance 156 stored in the REE 136 do validate, the monitor application instance 154 sends a RAN attach message to the second cell site 118 and the second RAN 120 comprising authentication credentials. The authentication credentials may comprise an identity of the IoT device 116, for example an electronic serial number (ESN) or other identifying information. The authentication credentials may comprise an identity of the OS2 144 that is executing in the REE 136. The authentication credentials may comprise the value of the checksum calculated by the monitor application instance 154 over the OS2 144 and/or portions of the OS2 instance 156 stored in the REE 136. If the credentials are validated by the second cell site 118 and/or the second RAN 120, the IoT device 116 is granted coverage from the second cell site 118 and/or the second RAN 120.

The checksum may be a number or numeric string having a predefined length that is calculated over each of the elements and/or artifacts of the OS 142, 144 or over a predefined selection of the artifacts of the OS 142, 144. For example, the checksum may comprise 4 bytes, 8 bytes, 12 bytes, or 16 bytes. In an embodiment, the checksum is between 3 bytes and 21 bytes long. The elements or artifacts of the OS 142, 144 comprise logic instructions or computer program instructions as well as data. In an embodiment, a predefined selection of the artifacts of the OS 142, 144 are processed by the monitor application instance 154 to calculate the checksum, whereby to reduce the processing burden of calculating the checksum. For example, if a predefined 10% of the artifacts making up the OS 142, 144 is selected for calculating the checksum and the identities of the artifacts listed in this predefined selection is maintained confidential, it is likely any tampering with the OS 142, 144 would still be identified by the simplified checksum. In an embodiment, between 35% and 25% of the artifacts of the OS are selected for use in calculation of the checksum. In an embodiment, between 25% and 15% of the artifacts of the OS are selected for use in calculating the checksum. In an embodiment, between 15% and 5% of the artifacts of the OS are selected for use in calculating the checksum. In an embodiment, less than 30% of the artifacts of the OS are selected for use in calculating the checksum. In an embodiment, less than 20% of the artifacts of the OS are selected for use in calculating the checksum. In an embodiment, less than 10% of the artifacts of the OS are selected for use in calculating the checksum.

Figure 3:
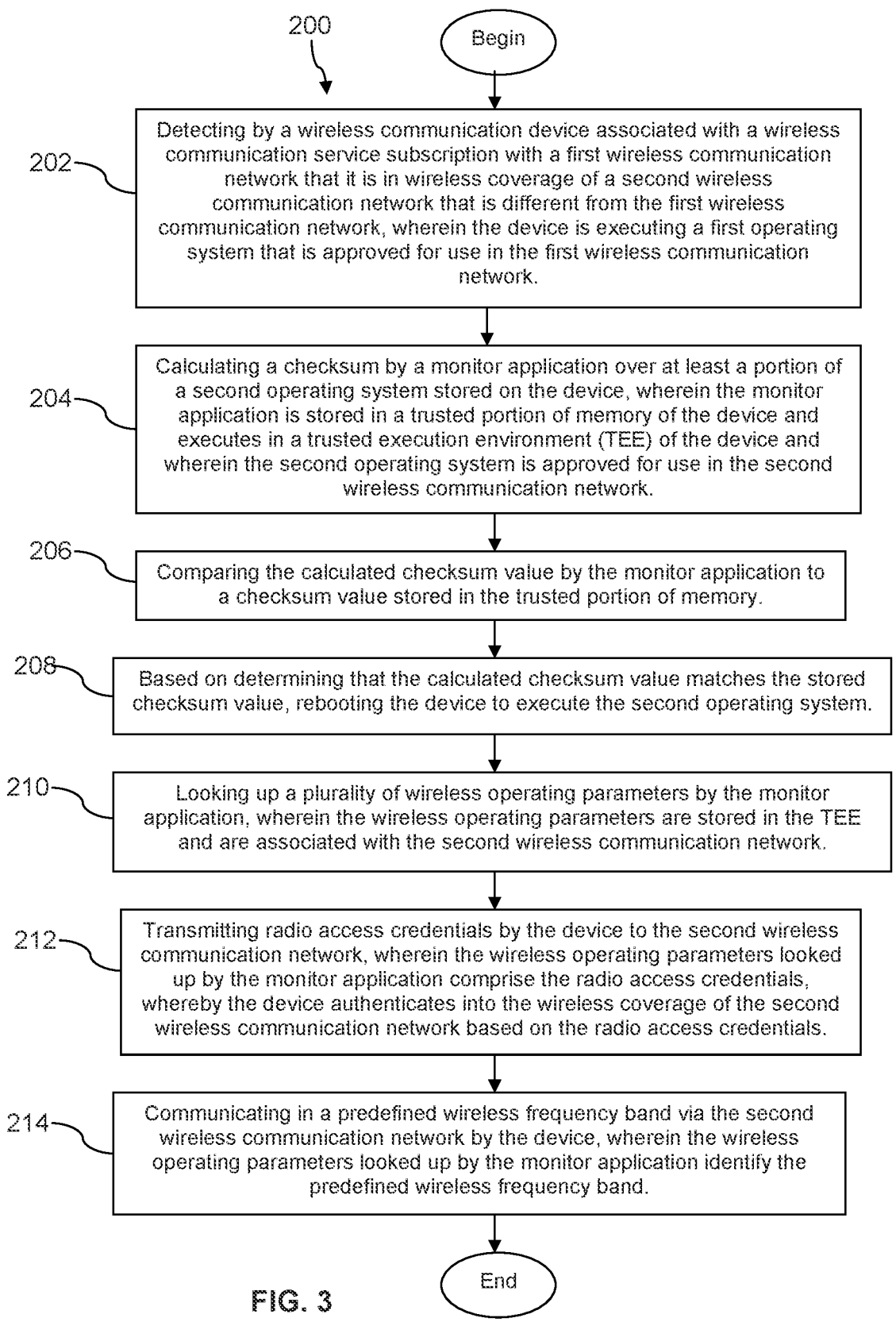
FIG. 3 is a flow chart of a method according to an embodiment of the disclosure.

Turning now to FIG. 3, a method 200 is described. In an embodiment, the method 200 is a method of attaching to a wireless communication network to receive wireless communication service. At block 202, the method 200 comprises detecting by a wireless communication device associated with a wireless communication service subscription with a first wireless communication network that it is in wireless coverage of a second wireless communication network that is different from the first wireless communication network, wherein the device is executing a first operating system that is approved for use in the first wireless communication network.

At block 204, the method 200 comprises calculating a checksum by a monitor application over at least a portion of a second operating system stored on the device, wherein the monitor application is stored in a trusted portion of memory of the device and executes in a trusted execution environment (TEE) of the device and wherein the second operating system is approved for use in the second wireless communication network. The checksum may be a number or numeric string that has a predefined length. The checksum may be 4 bytes long, 8 bytes long, 12 bytes long, 16 bytes long, or 20 bytes long. In an embodiment the checksum is more than 3 bytes long and less than 33 bytes long. At block 206, the method 200 comprises comparing the calculated checksum value by the monitor application to a checksum value stored in the trusted portion of memory. The stored checksum value may be referred to as an authoritative checksum value. The authoritative checksum value may be stored in the trusted portion of memory at time of manufacture. The checksum value may be indexed to or associated with an identity of the second wireless communication service provider or a second RAN operated by the second service provider.

At block 208, the method 200 comprises based on determining that the calculated checksum value matches the stored checksum value, rebooting the device to execute the second operating system. In an embodiment, the method 200 may further comprise validating at least a portion of the second operating system instance executing in a rich execution environment (REE) of the device. At block 210, the method 200 comprises looking up a plurality of wireless operating parameters by the monitor application, wherein the wireless operating parameters are stored in the TEE and are associated with the second wireless communication network.

At block 212, the method 200 comprises transmitting radio access credentials by the device to the second wireless communication network, wherein the wireless operating parameters looked up by the monitor application comprise the radio access credentials, whereby the device authenticates into the wireless coverage of the second wireless communication network based on the radio access credentials.

At block 214, the method 200 comprises communicating in a predefined wireless frequency band via the second wireless communication network by the device, wherein the wireless operating parameters looked up by the monitor application identify the predefined wireless frequency band. The wireless operating parameters and/or the predefined wireless frequency band may be stored in the trusted portion of memory 146. The wireless operating parameters and/or the predefined wireless frequency band may be stored in the trusted portion of memory 146 at the time of manufacture of the IoT device 102, 116.

The processing of block 214 may further comprise restricting the wireless communication of the IoT device 102, 116 based on a service level agreement (SLA) stored in the trusted portion of memory 146. The SLA may be approved by the second wireless communication service provider for use in the second wireless network, for example in the second RAN 120. The wireless communication service providers may offer inexpensive service plans to IoT devices 102, 116 whereby to make wireless communication affordable for use by a very large number of IoT devices 102, 116. To make such inexpensive service plans economically sustainable for the service providers, the service plans may restrict wireless communication by the IoT devices 102, 116 to specific wireless frequency bands and in compliance with constraints related to frequency of message transmission, maximum message size, and communication protocols that the IoT devices 102, 116 may employ. These restrictions may be defined by the SLA and enforced by the monitor application instance 154 and/or by the approved operating system executing in the REE 136.

Figure 4:
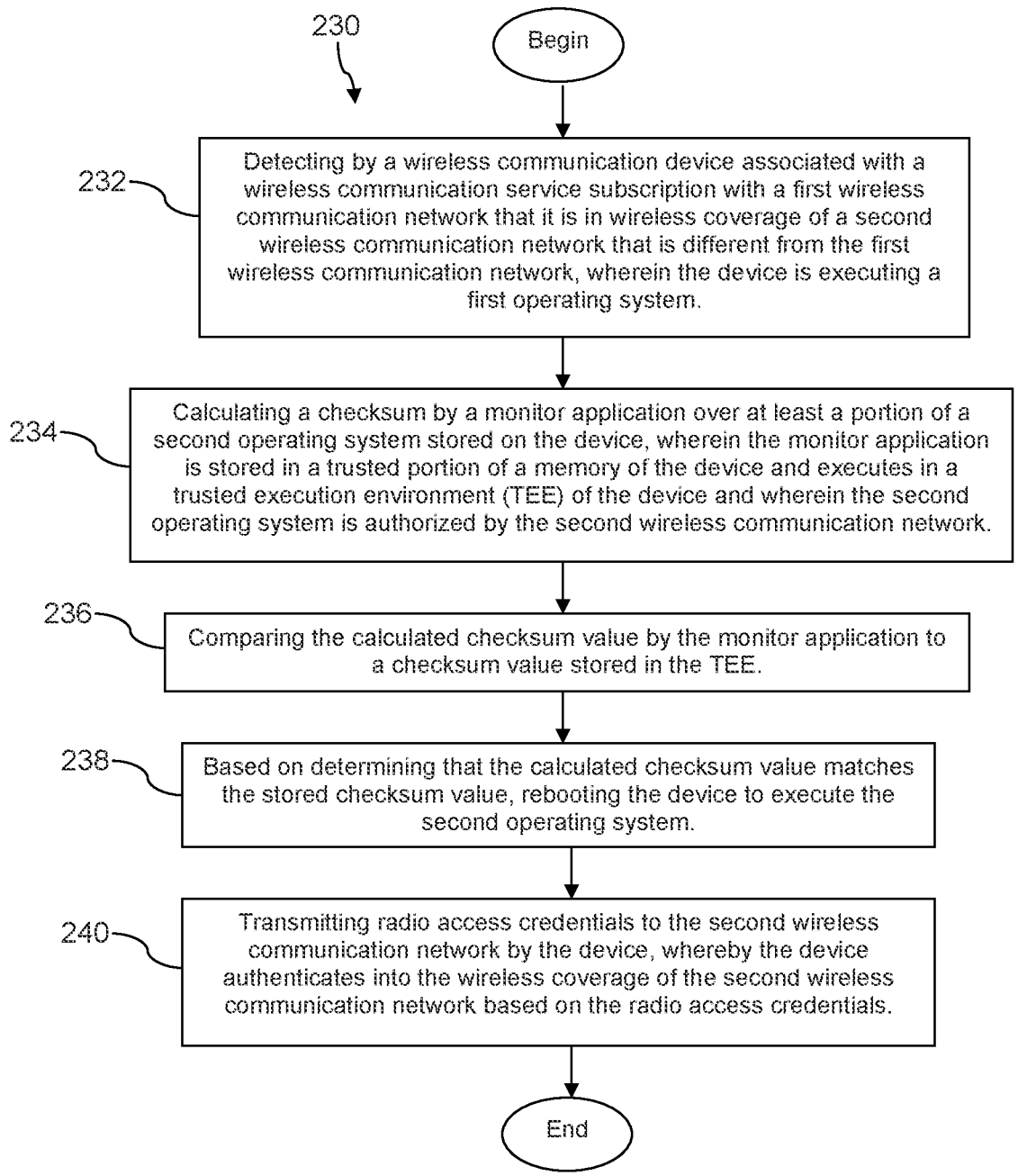
FIG. 4 is a flow chart of another method according to an embodiment of the disclosure.

Turning now to FIG. 4, a method 230 is described. In an embodiment, the method 230 is a method of attaching to a wireless communication network to receive wireless communication service. At block 232, the method 230 comprises detecting by a wireless communication device associated with a wireless communication service subscription with a first wireless communication network that it is in wireless coverage of a second wireless communication network that is different from the first wireless communication network, wherein the device is executing a first operating system.

At block 234, the method 230 comprises calculating a checksum by a monitor application over at least a portion of a second operating system stored on the device, wherein the monitor application is stored in a trusted portion of memory of the device and executes in a trusted execution environment (TEE) of the device and wherein the second operating system is authorized by the second wireless communication network. At block 236, the method 230 comprises comparing the calculated checksum value by the monitor application to a checksum value stored in the TEE.

At block 238, the method 230 comprises, based on determining that the calculated checksum value matches the stored checksum value, rebooting the device to execute the second operating system. At block 240, the method 230 comprises transmitting radio access credentials to the second wireless communication network by the device, whereby the device authenticates into the wireless coverage of the second wireless communication network based on the radio access credentials.

Figure 5:
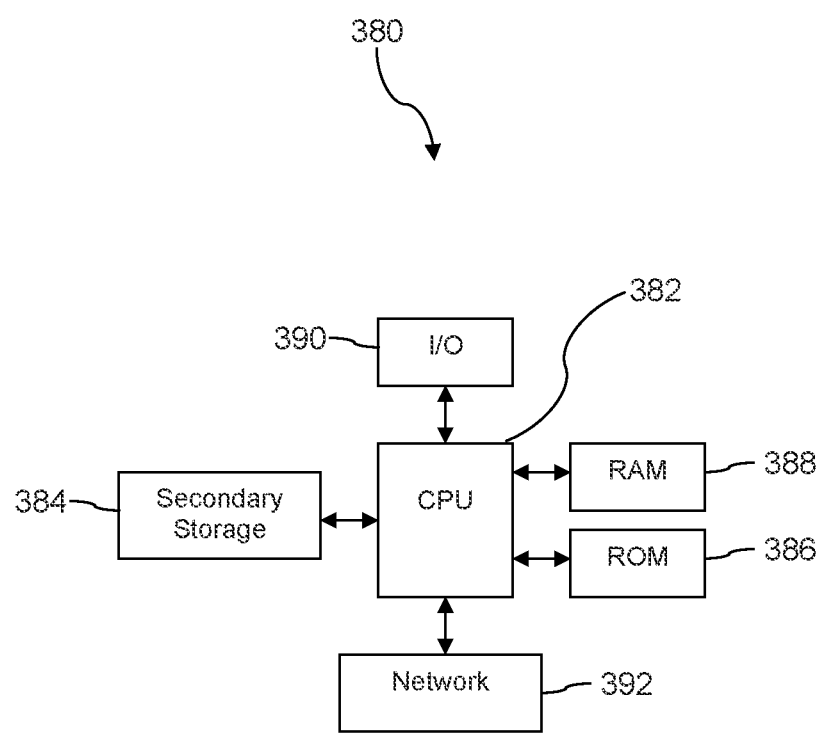
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An Internet of Things (IoT) device, comprising:
a processor, wherein the processor is configured to provide a trusted execution environment (TEE) and a rich execution environment (REE);
a non-transitory memory comprising a trusted portion and a non-trusted portion, wherein the non-trusted portion of the non-transitory memory stores a first operating system approved for use in a first wireless communication network and a second operating system approved for use in a second wireless communication network;
a radio transceiver; and
a monitor application stored in the trusted portion of the non-transitory memory that when executed by the processor in the TEE:
while connected to the first wireless communication network, in response to determining that the IoT device is in a coverage area of the second wireless communication network and while the processor is executing the first operating system in the REE, calculates a checksum over at least a portion of the second operating system,
compares the calculated checksum value to a checksum value stored in the trusted portion of the non-transitory memory,
based on determining that the calculated checksum value matches the stored checksum value, reboots the processor to execute the second operating system in the REE, and
transmits radio access credentials to the second wireless communication network via the radio transceiver, whereby the IoT device authenticates into the wireless coverage of the second wireless communication network based on the radio access credentials.

2. The IoT device of claim 1, wherein the radio transceiver is configured to provide a wireless communication link to a cell site in accordance with one of a 5G, a long term evolution (LTE), a code division multiple access (CDMA), or a global system for mobile communications (GSM) telecommunication protocol.

3. The IoT device of claim 1, wherein the radio access credentials comprise the calculated checksum value.

4. The IoT device of claim 1, wherein the IoT device collects sensor data and transmits the sensor data via the radio transceiver to a server computer via the second wireless communication network.

5. The IoT device of claim 4, wherein the trusted portion of the non-transitory memory stores an identity of a wireless frequency band associated with the second wireless communication network and the radio transceiver communicates via the second wireless communication network on the identified wireless frequency band.

6. The IoT device of claim 1, wherein the checksum is calculated by the monitor application over a predefined selection of artifacts of the second operating system.

7. The IoT device of claim 1, wherein the trusted portion of the non-transitory memory stores a service level agreement (SLA) approved by a second wireless communication service provider associated with the second wireless communication network, and wherein wireless communication is restricted based on the SLA.

8. A method of attaching to a wireless communication network to receive wireless communication service, comprising:
detecting by a wireless communication device associated with a wireless communication service subscription with a first wireless communication network that it is in wireless coverage of a second wireless communication network that is different from the first wireless communication network, wherein the wireless communication device is executing a first operating system;

responsive to the detection, calculating a checksum by a monitor application over at least a portion of a second operating system stored on the wireless communication device, wherein the monitor application is stored in a trusted portion of a memory of the wireless communication device and executes in a trusted execution environment (TEE) of the wireless communication device, and wherein the second operating system is authorized by the second wireless communication network;

comparing the calculated checksum value by the monitor application to a checksum value stored in the TEE;

based on determining that the calculated checksum value matches the stored checksum value, rebooting the wireless communication device to execute the second operating system; and transmitting radio access credentials to the second wireless communication network by the wireless communication device, whereby the wireless communication device authenticates into the wireless coverage of the second wireless communication network based on the radio access credentials.

9. The method of claim 8, wherein the second operating system is stored in a non-trusted portion of the memory of the wireless communication device.

10. The method of claim 8, wherein the wireless communication device is an Internet of Things (IoT) device.

11. The method of claim 8, wherein the first operating system, the second operating system, and the checksum value are stored in the trusted portion of the memory of the wireless communication device at the time of manufacture of the wireless communication device.

12. The method of claim 8, further comprising communicating in a predefined wireless frequency band via the second wireless communication network by the wireless communication device, wherein the frequency band is stored in the trusted portion of memory of the wireless communication device.

13. The method of claim 8, further comprising restricting the wireless communication of the wireless communication device based on a service level agreement (SLA) stored in the trusted portion of the memory of the wireless communication device, wherein the SLA is approved by the second wireless communication service provider.

14. A method of attaching to a wireless communication network to receive wireless communication service, comprising:

detecting by a wireless communication device associated with a wireless communication service subscription with a first wireless communication network that it is in wireless coverage of a second wireless communication network that is different from the first wireless communication network, wherein the wireless communication device is executing a first operating system that is approved for use in the first wireless communication network;

responsive to the detection, calculating a checksum by a monitor application over at least a portion of a second operating system stored on the wireless communication device, wherein the monitor application is stored in a trusted portion of memory of the wireless communication device and executes in a trusted execution environment (TEE) of the wireless communication device and wherein the second operating system is approved for use in the second wireless communication network;

comparing the calculated checksum value by the monitor application to a checksum value stored in the trusted portion of memory;

based on determining that the calculated checksum value matches the stored checksum value, rebooting the wireless communication device to execute the second operating system;

looking up a plurality of wireless operating parameters by the monitor application, wherein the wireless operating parameters are stored in the TEE and are associated with the second wireless communication network;

transmitting radio access credentials by the wireless communication device to the second wireless communication network, wherein the wireless operating parameters looked up by the monitor application comprise the radio access credentials, whereby the wireless communication device authenticates into the wireless coverage of the second wireless communication network based on the radio access credentials; and communicating in a predefined wireless frequency band via the second wireless communication network by the wireless communication device, wherein the wireless operating parameters looked up by the monitor application identify the predefined wireless frequency band.

15. The method of claim 14, wherein the wireless communication device is an Internet of things (IoT) device.

16. The method of claim 14, wherein the checksum is calculated by the monitor application over a predefined selection of artifacts of the second operating system.

17. The method of claim 14, wherein the checksum stored in the trusted portion of memory is stored at a time of manufacture of the wireless communication device.

18. The method of claim 14, wherein the first operating system and the second operating system are stored in a rich portion of the memory of the wireless communication device.

19. The method of claim 14, wherein the wireless coverage of the second wireless communication network is provided in accordance with one of a 5G, a long term evolution (LTE), a code division multiple access (CDMA), or a global system for mobile communications (GSM) radio protocol.

20. The method of claim 14, wherein the radio access credentials comprise the calculated checksum value.

* * * * *